United States Patent [19]

Tresselt

[11] 3,898,655
[45] Aug. 5, 1975

[54] VARIABLE RANGE CUT-OFF SYSTEM FOR DUAL FREQUENCY CW RADAR

[75] Inventor: Carl P. Tresselt, Detroit, Mich.

[73] Assignee: The Bendix Corporation, Southfield, Mich.

[22] Filed: Jan. 14, 1974

[21] Appl. No.: 433,027

[52] U.S. Cl. ................ 343/7.5; 343/7 A; 343/7.3; 343/9
[51] Int. Cl.² ..................... G01S 9/20; G01S 9/44
[58] Field of Search ............... 343/7 A, 7.3, 7.5, 9

[56] References Cited
UNITED STATES PATENTS

| | | | |
|---|---|---|---|
| 2,869,119 | 1/1959 | Fredrick | 343/7 A X |
| 2,981,942 | 4/1961 | Gross | 343/7.3 |
| 3,101,470 | 8/1963 | Vosburgh et al. | 343/9 |
| 3,110,024 | 11/1963 | Jennings | 343/7 A |
| 3,155,972 | 11/1964 | Boyer | 343/12 R |
| 3,503,068 | 3/1970 | Yamauchi | 343/7.3 |
| 3,766,554 | 10/1973 | Tresselt | 343/9 X |
| 3,801,981 | 4/1974 | Alpers | 343/7.5 |

Primary Examiner—Malcolm F. Hubler
Attorney, Agent, or Firm—W. G. Christoforo; Bruce L. Lamb

[57] ABSTRACT

A system for rendering a CW radar insensitive to targets beyond a variable range, wherein two discrete frequency signals are alternately transmitted so that two doppler frequencies, whose phase relationships are indicative of target range, are produced at the receiver, includes means for turning off the receiver for a variable interval between transmission of the two frequencies and by gating the receiver so that video output is produced only during a portion of each transmitted signal. The variable interval periods are determined in accordance with vehicle speed and/or range to a selected target.

9 Claims, 5 Drawing Figures

VARIABLE RANGE CUT-OFF SYSTEM FOR DUAL FREQUENCY CW RADAR

CROSS REFERENCE TO RELATED APPLICATIONS

The present invention is an improvement over a system described in patent application Ser. No. 119,780, filed Mar. 1, 1971, now U.S. Pat. No. 3,766,554, by the same inventor herein and assigned to the assignee of the present application. The cross related application issued as U.S. Pat. No. 3,766,554 on Oct. 16, 1793. A Traffic Responsive Speed Control System with which the invention can be advantageously used is described in U.S. Pat. No. 3,725,921.

BACKGROUND OF THE INVENTION

This invention relates to continuous wave doppler radar systems and more particularly to means for rendering said systems essentially insensitive to targets beyond a maximum range, wherein the maximum range is variable in accordance with certain parameters.

In the above mentioned related patent application there was described a continuous wave doppler radar system which was used in an adaptive speed control system, particularly for automotive vehicles. Two discrete radar frequencies were alternately transmitted. Target return signals were mixed with the transmitted frequencies to produce a doppler signal for each discrete radar frequency. The phase relationship between the doppler signals provided a measure of target range and whether the target was approaching or receding. Relative velocity of the target was obtained from one or the other of the doppler signals. The invention in the above related application particularly concerned means for rendering the radar system insensitive to targets which lay beyond a predetermined maximum range. In particular, in the embodiment described therein the maximum range was taken as approximately 300 feet. Range cutoff was accomplished by turning off the transmitter for an interval between the transmission of the two frequencies and by gating the receiver so that video output was provided only during the final portion of each transmitted signal.

As is well known in the adaptive speed control art it is normally desirable that the radar system capture and track the closest target ahead. Without a range cutoff system such as that described in the above mentioned related application it was possible for a large target at a relatively longer range than a smaller target of poor radar cross section at a shorter range to cause such interference that the radar system exhibited uncertainty as to which target to acquire and track and might even track the larger target at the greater range. This problem was substantially alleviated in the invention described in the above mentioned related application, particularly where the large target was beyond the 300 foot maximum range of the radar system. However, for large interfering targets located within 300 feet of the radar system, uncertainty can again become a problem. For example, there might tend to be a hunting action of the radar when following a car having a small or poor radar cross section and which is located behind a semi-trailer which is within 300 feet of the radar system, with the radar reflection from the semi-trailer at the longer range exceeding the target signal from the small car. The vehicle on which the adaptive speed control is installed, herein termed the speed control car, will in this case accelerate in an attempt to satisfy the headway equation with respect to the semi-trailer, thus moving the speed control car up on the small car until the latter dominates the antenna beam. This thus leads to a released throttle and subsequent backing on the relative range. This hunting action can continue to the discomfort of or danger to the car passenger.

SUMMARY OF THE INVENTION

It is a main purpose of this invention to minimize or eliminate the effect last mentioned above. Specifically, it is the main purpose of this invention to provide a means for rendering a radar system of the type described above insensitive to targets beyond a variable range of the radar system. This is accomplished by turning off the radar transmitter for a variable interval between the alternate transmission of two frequencies and by gating the receiver so that video output is produced only during a portion of each transmitted signal. The length of the variable interval periods is determined in accordance with certain parameters such as vehicle speed, range to a selected target, stepwise searching fashion, etc.

Another primary object of this invention is to eliminate or reduce false alarms in a radar braking system by reducing the range of the radar as the vehicle goes around corners and sharp curves at reduced speeds. In this regard, it is common knowledge that a vehicle will be reduced in speed as it maneuvers around corners and sharp curves. If the effective range of a radar system of the type described above is made dependent upon the speed of the vehicle, then at these reduced speeds the effective radar range will also be reduced, as will be explained below. Thus, certain potential targets which are off to the side of the road, such as signs or parked cars, which might ordinarily be illuminated by the radar system during the turn, will be beyond the effective range of the radar and hence will not be processed thereby.

Another object of the invention is to provide a variable range cutoff system for an adaptive speed control which will result in improved comfort and safety to a vehicle's occupants.

A further object of the invention is to provide means for memorizing range to an acquired target and for generating an r.f. pulsewidth in accordance with the range. In addition the memory means will provide means for maintaining the r.f. pulsewidth relatively constant for some period of time after a target disappears.

These and other objects of the invention will become apparent from a reading and understanding of the following description, claims and drawings wherein:

DESCRIPTION OF THE PREFERRED EMBODIMENT

Figure 1:
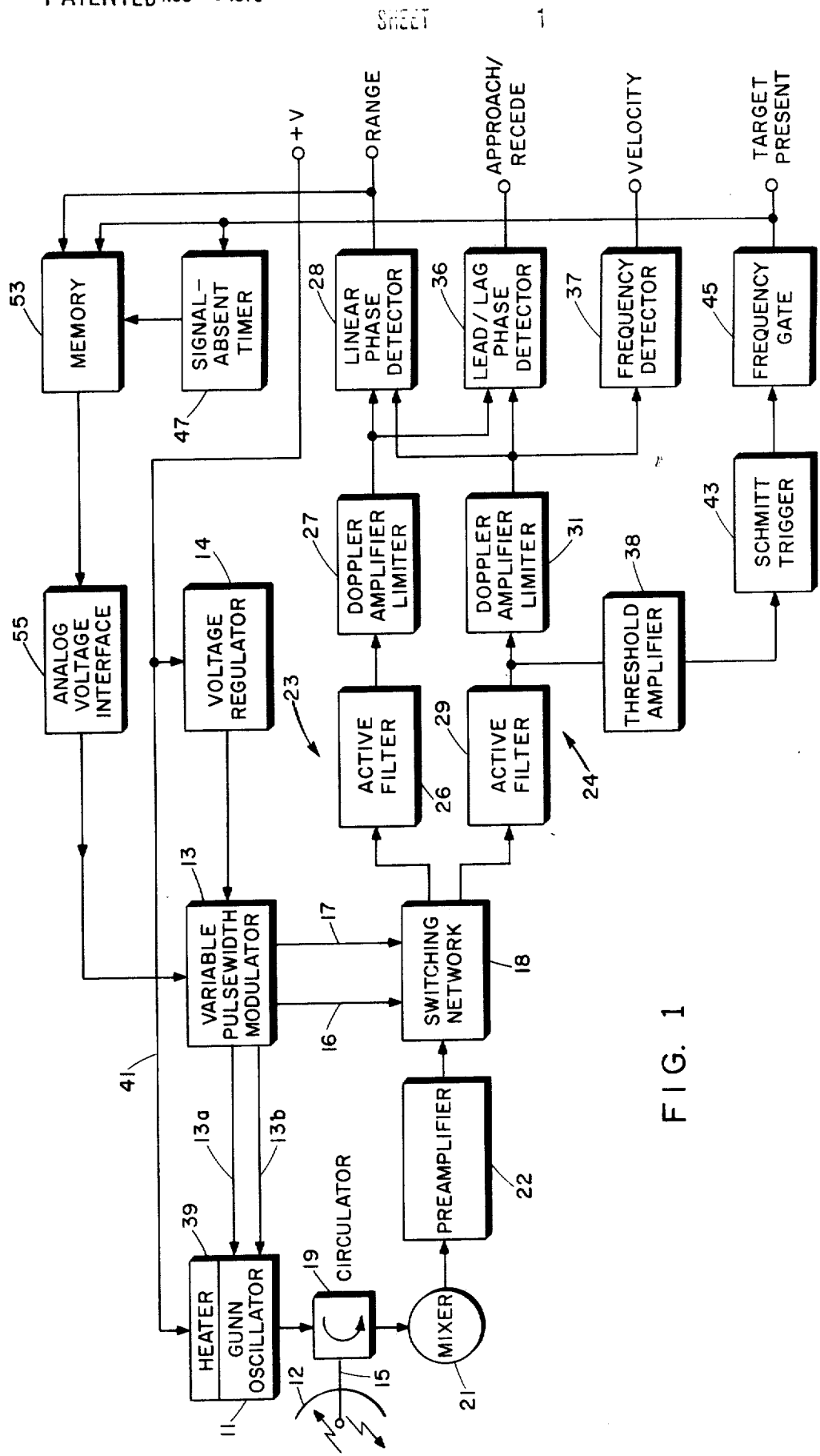
FIG. 1 is a block diagram of the preferred embodiment of the invention.

Refer to FIG. 1 which shows an embodiment of an adaptive speed control system with which the invention can be advantageously employed. An oscillator 11 is used to generate an r.f. frequency which is applied through circulator 19 for transmission by antenna 12. Antenna 12 also suitably receives the energy reflected from a target (not shown). Oscillator 11 is modulated by modulator 13 so that at least two discrete frequencies are sequentially and cyclically produced. As an example, oscillator 11 can be a Gunn diode. As is known, a Gunn diode is a device which simultaneously can serve as an oscillator and a mixer. As an oscillator, the Gunn diode produces an output, the frequency of which is dependent upon the biasing voltage applied to the diode. Accordingly, by changing the biasing voltage, the frequency of the r.f. output can be changed. As an alternative scheme, the Gunn diode could be directly coupled to the antenna which simultaneously transmits and receives energy. The diode itself would then serve to mix the two signals, that is the transmitted and the received signals, and produce a doppler output signal therefrom. It should be noted that, in either embodiment, the use of a Gunn diode is not essential to the system as other similar and known devices, such as an avalanche diode, can also be used to perform the same function. Furthermore, still other types of oscillators can be used in the embodiment of FIG. 1 if desired, the only requirement being that they be capable of transmitting two discrete frequencies at predetermined intervals of time.

For purpose of explaining the invention, a Gunn source with a separate means of varying frequency has been illustrated. The output of modulator 13 can be applied directly to the Gunn oscillator 11 where alternately, on-off modulation of the oscillator is achieved by directly pulsing the Gunn diode supply voltage via line 13b. The output frequency changes would then be achieved by pulsing via line 13a a separate element, such as a varactor, or YIG sphere or other ferrite material. It should also be noted that a PIN diode can be used to tune the transmitter between frequencies $f_1$ and $f_2$ by using the PIN to change the reactance presented to the transmitter by other reactance elements. The change in reactance of the separate element would then tune the cavity containing the Gunn diode. The combination of these modulating signals results in the desired output from the Gunn oscillator. Modulator 13 is actuated by a +V voltage source through a voltage regulator 14.

It should be noted that the antenna to circulator waveguide section 15 is intentionally mismatched so that a desired level of r.f. leakage from the transmitter is routed through circulator 19 directly to mixer 21 without passing via the antenna through space. As a consequence, the leakage signal acts as a local oscillator in mixer 21 during transmission periods. Consequently, when a radar return signal is received at antenna 12, it is directed by circulator 19 to mixer 21, together with the leakage signal from oscillator 11, where a sample of doppler frequency is generated. The doppler signal is amplified to a desired level in a preamplifier 22 and then applied through switching network 18 to one of two channels 23 or 24 in accordance with which line 16 or 17 of modulator 13 is at that time energized. It will be explained below that line 16 is energized while a first frequency $f_1$ is being transmitted by the radar system and line 17 is energized while a frequency $f_2$ is transmitted by the radar system.

Figure 2:
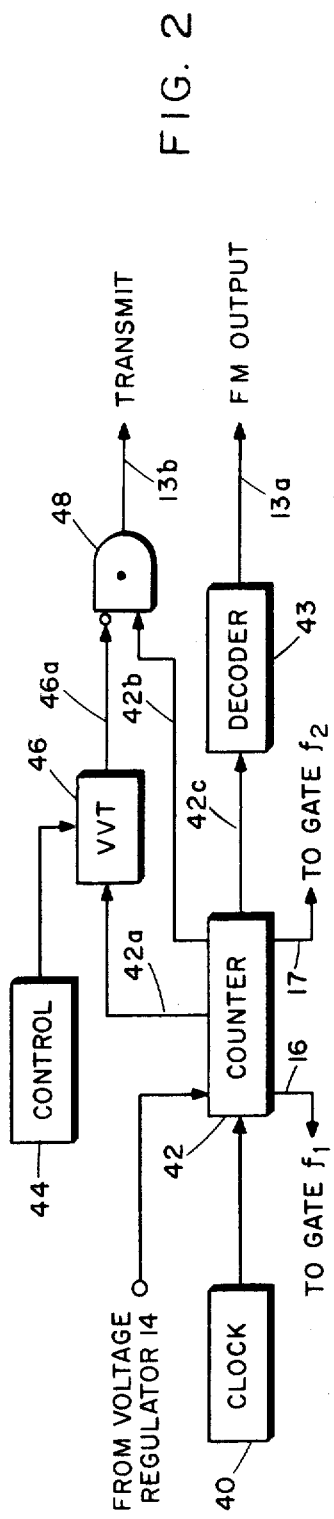
FIG. 2 is a block diagram which illustrates a form of the modulator 13 of FIG. 1 in greater detail.
Figure 3:
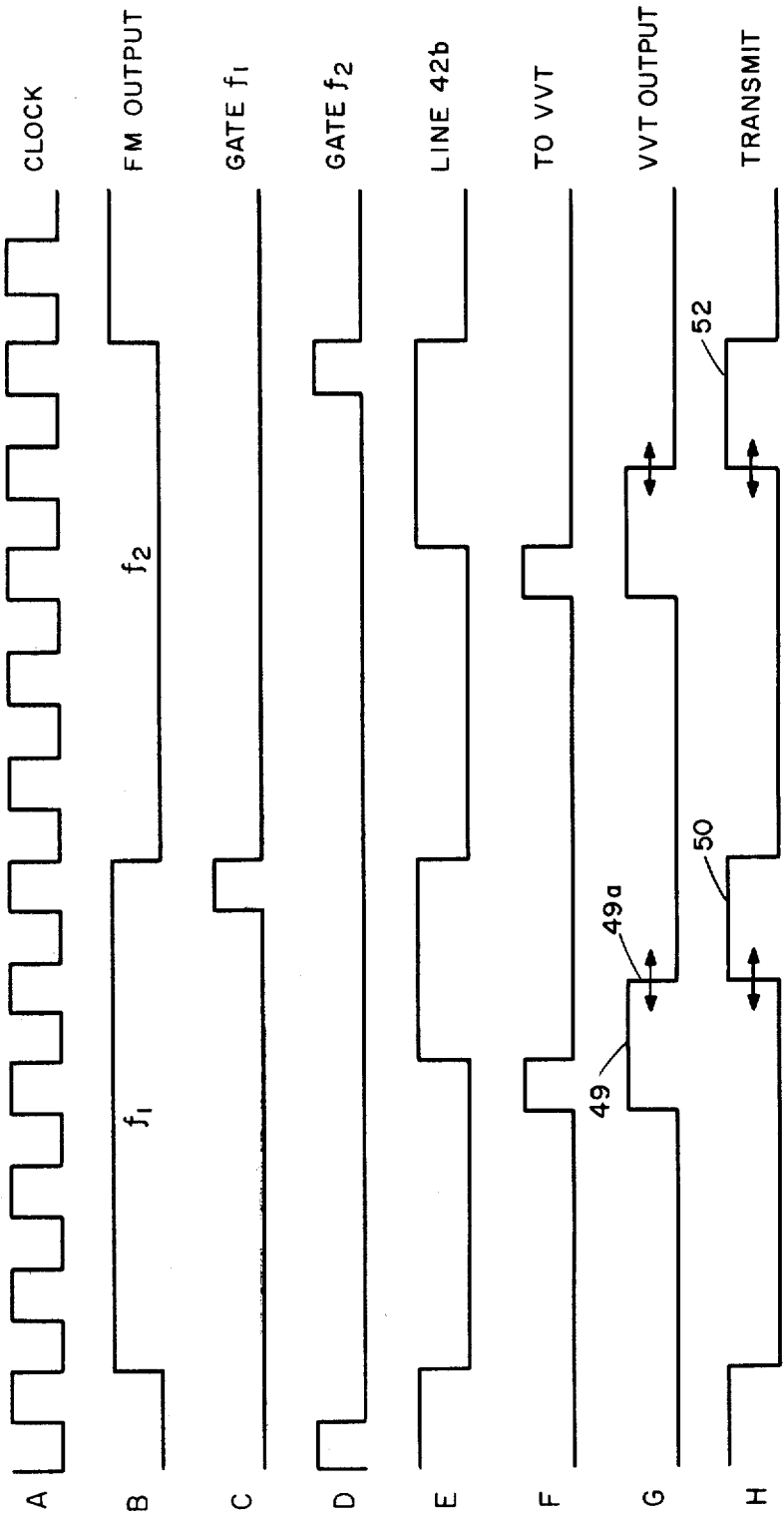
FIG. 3 illustrates the signals as idealized at various points in the invention embodiment. The signals are drawn to a common time scale.

Refer now to FIG. 2 which shows in greater detail the composition of various of the elements suitably contained in modulator 13 and also to FIG. 3 which is helpful in explaining the operation of the device of FIG. 2. In FIG. 2 a clock 40 produces a train of clock pulses such as those seen in FIG. 3 at line A. These clock pulses are applied to a counter 42 which is suitably comprised of a cascade of binary elements, such as flip flops, which count the clock pulses applied thereto. In the embodiment shown, counter 42 generates a square wave output signal at line 42c, the square wave output signal having a period which is ten times the period of the clock pulses applied to the counter. The square wave is applied to a decoder 43 which in response thereto produces alternately two voltage levels at line 13a which are applied to modulate oscillator 11 to produce the output frequencies $f_1$ and $f_2$ as noted at line B of FIG. 3.

Counter 42 also produces an output signal at line 42b the waveform of which is illustrated at line E of FIG. 3. The high portion of this signal is applied to gate 48 which is normally inhibited by a signal applied at line 46a from voltage variable timer (VVT) 46.

Counter 42 also generates a signal on line 42a the waveform of which is seen at line F of FIG. 3. It should be noted that the signal on line 42a comprises a pulse having a length which is half the clock period.

The leading edge of the pulse on line 42a triggers the voltage variable timer 46 to generate an output pulse 49 which appears on line 46a of FIG. 2 and is seen at line G of FIG. 3. The trailing edge 49a of this output pulse varies in accordance with a control voltage applied to the voltage variable timer from a control box 44. It can be seen that the output signal on line 46a begins before the signal on line 42b. Gate 48 remains inhibited for the duration of the voltage variable timer output signal, whose trailing edge is variable in accordance with the control signal of control box 44 as aforementioned. At the termination of the voltage variable timer output signal gate 48 opens so as to energize line 13b which permits the radar system to transmit the appropriate frequency. For example, during the pulse 50 at line H of FIG. 3 the radar system generates a signal of the $f_1$ frequency, while during pulse 52 the radar system generates a signal of the $f_2$ frequency. It will be noted that when the pulse on line 42b terminates gate 48 closes, terminating a particular transmission from the radar system.

In addition to the above, counter 42 generates a signal on line 16 (seen at C of FIG. 3) during the final portion of the $f_1$ frequency transmission period. This signal is applied to the switching network 18 of FIG. 1 permitting and directing a sample of doppler signal into channel 23. In addition, counter 42 generates a signal at line 17 (seen at line D of FIG. 3)) during the final portion of the $f_2$ frequency transmission period. This signal conditions switching network 18 to direct a simultaneously received sample of doppler signal into channel 24. In this embodiment these gating signals at lines 16 and 17 occur during one-half period of the clock signal and during the final portion of their associated transmitted frequency signal, $f_1$ or $f_2$.

Figure 4:
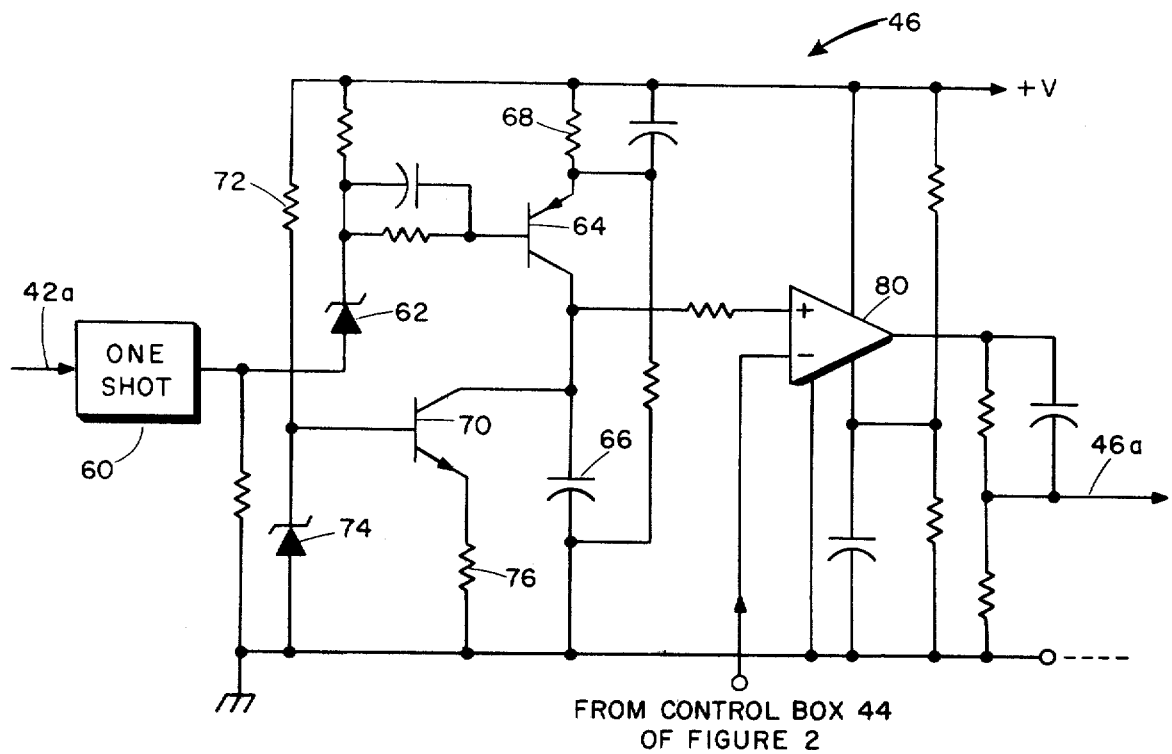
FIG. 4 shows a modified schematic of a form of the voltage variable timer (VVT) of FIG. 2.

Refer now to FIG. 4 which shows in greater detail the voltage variable timer circuit 46. The circuit shown here is essentially a faster version of a circuit suggested by Eric Breeze in an article titled "Comparator and Multivibrator Add Up to a Linear VCO," which appeared on page 90 of "Electronics," Aug. 17, 1970. The leading edge of the pulse at line 42a, also seen in FIG. 2, triggers a one-shot 60 which in response thereto produces a relatively short output pulse. The output pulse, fed through Zener diode 62, turns on transistor 64 for the duration of this output pulse. This event charges a capacitor 66 which is connected between the collector electrode of transistor 64 and a ground connection. It will be noted that the emitter electrode of transistor 64 is connected through resistor 68 to a +V voltage terminal. During the time that transistor 64 is on, capacitor 66 charges almost to the full +V value. In any event, the level to which capacitor 66 charges is essentially the same each time one-shot 60 generates its output pulse. The positive plate of capacitor 66 is connected to the collector electrode of NPN transistor 70. The emitter electrode of this transistor is connected through resistor 76 to ground. The base electrode is connected to the common junction of resistor 72 and Zener diode 74 which are connected across the voltage source. Transistor 70 is thus a constant current source. After the one-shot 60 output pulse, capacitor 66 discharges through the constant current source comprised of transistor 70. The capacitor voltage is resistively coupled to the non-inverting input of comparator 80. A control potential received from control box 44 of FIG. 2 is applied to the inverting input of the comparator. When the capacitor voltage falls below the control potential the comparator changes state generating an output which is applied on line 46a which output is illustrated at line G of FIG. 3.

The control potential fed to the inverting input of comparator 80 thus determines the position of the trailing edge of the output pulse of voltage variable timer 46. If this voltage is just below the voltage to which capacitor 66 is charged during the one-shot 60 output pulse, a very short time is required for capacitor 66 to discharge to the control potential level and the output signal from comparator 80 occurs earlier in time with the result that the radar transmission period is relatively long. Lower control potential setting will result in comparator output pulses delayed further in time so that the radar transmission time becomes relatively shorter. In practice the radar transmission time, or r.f. pulsewidth, is set during radar operation to provide adequate sensitivity to the range of target being tracked.

Figure 5:
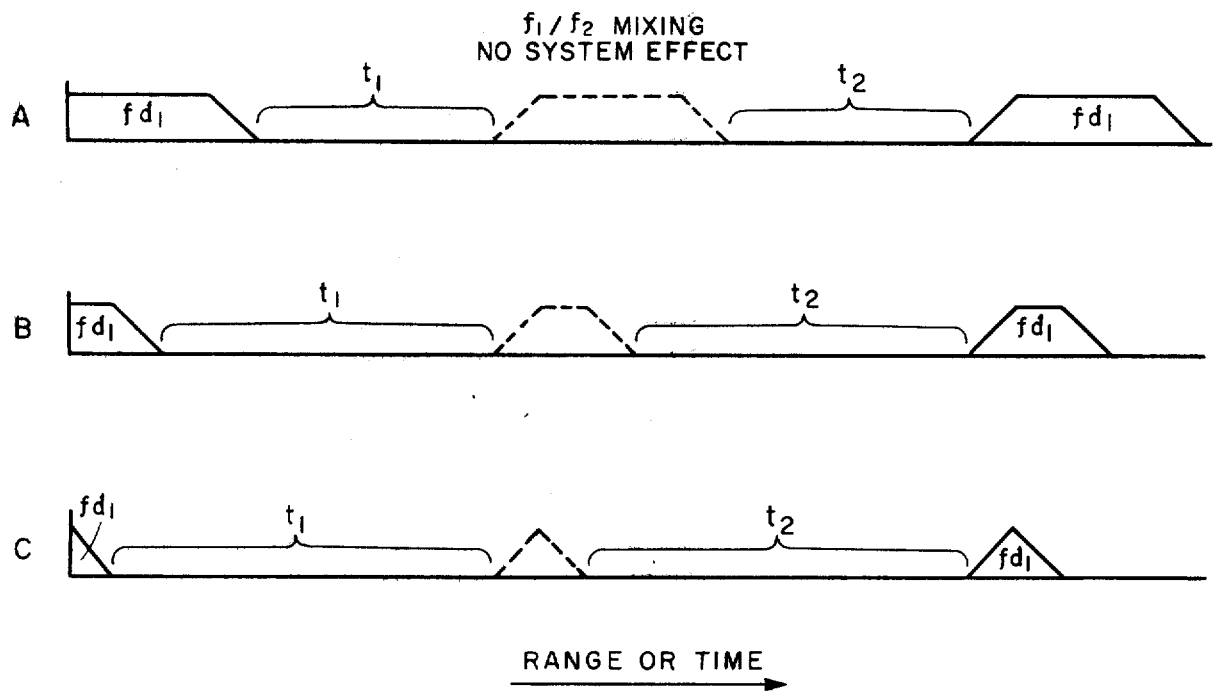
FIG. 5 shows the effect on radar range of certain variations of r.f. pulsewidth.

Refer now to FIG. 5 which shows the relative doppler channel receiver sensitivity (in this example channel 23 of FIG. 1) versus range between the radar and a target. Three examples are shown at lines A, B and C which are drawn to a common range or time scale. At line A the r.f. pulsewidth, that is the pulsewidth of the radar transmission, is relatively long and decreases progressively at lines B and C. In considering FIG. 5 it should be remembered that range is related to the round trip radar signal propagation time and hence range is equivalent to time so that the range scale is also a time scale. It should also be realized that any radar return signals received during the radar transmitter off period will have no effect on the system as no doppler can be produced in the absence of a sample of transmitted signal local oscillations. In this figure the transmitter off time occurs during the periods $t_1$ and $t_2$, and as a consequence the system is completely insensitive to all targets lying within the range equivalent to these time periods. It is assumed that during the time period represented by the first pulse, labeled $fd_1$ that the radar system is generating the $f_1$ frequency signal. Accordingly, targets located within the range defined by that pulse, generate a doppler frequency which is applied to channel 23 of FIG. 1. It can be seen that as the transmission time period decreases the effective range at least for the first $fd_1$ period also decreases.

Because of propagation delays, distant targets can cause signals of one frequency to arrive at the receiver while the other frequency is being transmitted. In other words, there is a mixing of the $f_1$ and $f_2$ signals. In FIG. 5 this is assumed to occur during the time period defined by the dashed lines. The doppler signal caused by these signals typically will have no affect on the system, because it is outside the doppler frequency acceptance range of the receiver.

An ambiguity occurs when there is mixing of a transmitted signal of one frequency and a reflection resulting from an immediately preceding signal of the same frequency. This can occur at the extended range defined by the second $fd_1$ pulses of FIG. 5. Although these doppler signals would normally fall within the doppler frequency acceptance range of the receiver they will generally have no affect on the receiver because of their extended range and the resulting propagation attenuation which, as is well known, is in accordance with the fourth power or range. Therefore, it is quite easy to design the system so that signals from these extended ranges will be below the sensitivity level of the receiver.

Returning now to FIG. 2 the control voltage generated by control box 44 can depend upon a number of various parameters. For example, for a slow moving vehicle it is only necessary that the effective range of its radar be relatively short while for a faster moving vehicle it is desirable that the effective range be relatively greater. Thus, control box 44 can respond to the speed of the vehicle such as by ganging the control box to a vehicle wheel or the drive shaft to generate a d.c. output voltage which is related to vehicle speed. Vehicle speed to d.c. devices of this type are well known in the art and need not be described further here. This form of control is desirable for reducing false alarms from incidental objects off the side of the road which ordinarily would be illuminated by the radar during sharp turning maneuvers at reduced speed. Another method of control might consist of means for searching from a minimum range to a maximum range until the target is detected. The system in that case would lock on to the first detected target. This can be accomplished by either sweeping the voltage continuously from one level to a second level or by stepping the voltage digitally. These types of voltage sweepers are known in the art and need not be described further. It should also be within the ability of one skilled in the art to produce a control box 44 which would sweep through a certain voltage range in an attempt to find a target, where the voltage range is determined by vehicle speed. Other means for generating the control voltage should now be apparent to one skilled in the art as well as other parameters to which these means are to respond.

Return now to FIG. 1 where channels 23 and 24 are respectively comprised of active filters 26, 29, doppler amplifier limiters 27, 31 and phase detectors 28, 36. Channels such as these and their interconnection to obtain range to a target and information as to whether the target is approaching or receding from the radar are well known and need not be repeated here, as is the use of a frequency detector 37 which responds to at least one of the doppler signals to produce a signal indicative of target velocity with respect to the radar.

Doppler information present in one or the other of the channels 23, 24 is detected by a threshold amplifier, such as threshold amplifier 38 which is connected to sense the occurrence of doppler information in channel 24. Threshold amplifier 38 linearly amplifies the doppler signal in the low signal strength region where the threshold is to be set. The output of threshold amplifier 38 is fed to Schmitt trigger 43 which provides the basic amplitude threshold effect with hysteresis. The Schmitt trigger signal is directed through a frequency gate 45 which operates to reject signals below a predetermined cutoff frequency. In a system actually built this cutoff frequency was 38 Hz. The output of frequency gate 45 is a binary signal whose presence indicates that a target is present and that the signals representing range, approach/recede and velocity are suitable for processing and for control of associated circuitry or systems such as radar speed control, radar brakes, etc.

As is also well known with respect to multiple frequency radar systems of the type here described, the radar system loses target tracking information whenever the relative velocity between the target and the radar is zero since in that case there is no usable doppler signal generated. Some memory function should be included to hold the r.f. pulsewidth relatively unchanged during these zero-relative-velocity events, which occur periodically during steady state target tracking. The memory function is performed by memory 53 which, so long as a target present signal is generated by gate 45, keeps itself updated with target range from linear phase detector 28. If the target present signal disappears, normally indicating steady state target tracking, memory 53 holds the last range value and applies it through analog voltage interface 55 to modulator 13 to maintain the r.f. pulsewidth relatively constant. Simultaneously, a signal absent timer 47 starts to run, which, after a predetermined time, if the target has not been reacquired, acts to release the memory so that the system can search for a new target such as by sweeping the control voltage as previously described. As might now be obvious, the signal absent timer 47, memory 53 and analog voltage interface 55 of FIG. 1 might be considered to comprise at least a portion of control block 44 of FIG. 2. It should also be understood that the target present signal when generated while the system is in the search mode will terminate the search mode and hold the acquired control voltage.

The signal absent timer provides generally for situations where the target actually moves out of the radar beam, such as for example where a target vehicle in the case of an adaptive speed control, moves to a different lane or leaves the road in a speedmatched condition.

In another embodiment suitable for use in radar braking applications, the range of the radar is set solely as some prescribed function of the velocity of the vehicle carrying the radar. A wheel speed or drive shaft sensor would typically generate the information required. In this instance, an electronic memory and signal absent timer can be eliminated. Since velocity information is continuously available from the speed sensor, other related systems can readily be devised by one skilled in the art that use a combination of radar car velocity and target car velocity and range, incorporating memory where required. Accordingly, the invention is to be limited only by the true spirit and scope of the appended claims.

The invention claimed is:

1. A range cutoff system for a continuous wave radar system wherein said radar system has a transmitter which transmits at least two discrete frequency signals and a receiver for producing doppler frequency signals in response to the reception of return signals from a target of the transmitted frequency signals, said cutoff system comprising:

modulation means for modulating said transmitter so that said discrete frequency signals are alternately transmitted and said transmitter produces no effective output for a variable time period between transmission of said discrete frequency signals and including means responsive to a control signal for varying said time period;

means responsive to predetermined parameters for generating said control signal; and, means responsive to the return signal from a target for generating a target present signal and including means responsive to said target present signal for ceasing variation of said variable time period whereby said variable time period is thereafter maintained relatively constant.

2. The range cutoff system of claim 1 wherein said radar system is installed in a movable vehicle and wherein said means responsive to predetermined parameters comprises means at least responsive to velocity of said vehicle for generating said control signal.

3. The range cutoff system of claim 1 wherein said receiver comprises means for processing said doppler signals including switching means and wherein said modulation means modulates said switching means so that said means for processing is effective for processing doppler signals only during a portion of the time period during which the discrete frequency signals are transmitted.

4. The range cutoff system of claim 1 wherein said receiver comprises at least a two channel receiver for processing at least two doppler frequency signals resulting from transmission of said discrete frequency signals and including switching means for alternately actuating the two channels synchronously with transmission of said discrete frequency signals only during a portion of the time periods during which the discrete frequency signals are transmitted.

5. The range cutoff system of claim 4 wherein said radar system is installed in a vehicle and wherein said means responsive to predetermined parameters comprises means at least responsive to velocity of said vehicle for generating said control signal.

6. The range cutoff system of claim 4 wherein said means responsive to predetermined parameters comprises means for varying said control signal on a predeterined schedule.

7. The range cutoff system of claim 1 wherein said modulation means comprises a timer which generates a cyclically occurring first signal and which generates a cyclically occurring second signal, only one of said first and second signals being instantaneously generated, and which generates a third signal and including means for modifying said third signal, a first of the discrete frequencies being transmitted during the simultaneous occurrence of said first signal and the modified third signal and a second of the discrete frequencies being transmitted during the simultaneous occurrence of said second signal and the modified third signal.

8. The range cutoff system of claim 1 including means responsive to said target present signal for memorizing the range to said target.

9. The range cutoff system of claim 8 wherein said means responsive to predetermined parameters responds at least to said memorized range at least for a predetermined time period after said target present signal is extinguished.

* * * * *